(12) United States Patent
Paulsen et al.

(10) Patent No.: US 6,205,672 B1
(45) Date of Patent: Mar. 27, 2001

(54) DIGITAL TIRE CALIPER

(75) Inventors: Craig Paulsen, Reno; Rick Capps, Fernley, both of NV (US)

(73) Assignee: Skinner, Sutton, Watson & Rounds, Reno, NV (US)

( * ) Notice: Subject to any disclaimer, the term of this patent is extended or adjusted under 35 U.S.C. 154(b) by 0 days.

(21) Appl. No.: 09/243,945

(22) Filed: Feb. 3, 1999

(51) Int. Cl.$^7$ ....................................................... G01B 5/08
(52) U.S. Cl. ............................... 33/784; 33/203; 33/555.1
(58) Field of Search ............................... 33/783, 784, 810, 33/811, 812, 203, 555.1

(56) References Cited

U.S. PATENT DOCUMENTS

| | | | |
|---|---|---|---|
| 4,216,584 | * 8/1980 | Meissner et al. | 33/784 |
| 4,607,436 | * 8/1986 | Clay | 33/203 |
| 5,465,501 | * 11/1995 | Rogler | 33/810 |
| 5,694,697 | * 12/1997 | Curtis | 33/203 |

* cited by examiner

*Primary Examiner*—G. Bradley Bennett
(74) *Attorney, Agent, or Firm*—Skinner, Sutton, Watson & Rounds

(57) ABSTRACT

Tires can be accurately and quickly measured by using a tire caliper that outputs data in digital form. A measuring instrument determines the diameter of automotive tires, preferably automotive race tires, and displays the circumference or the diameter at the users option, The tool of this invention has a digital display including a relatively elongate caliper body formed with a measuring part adapted to make measuring engagement with the tire to be measured. A member freely slidable in a longitudinal direction of the caliper body and formed with a measuring part disposed opposite to the measuring part of the caliper. In one preferred embodiment, the measuring instrument is marked with a transparent linear scale fixedly disposed on the caliper body with its axis extending in the longitudinal direction of the caliper body and a transparent index scale is mounted on the slider with its calibrated face disposed opposite to the calibrated face of the linear scale and slightly spaced apart relationship. In this embodiment, a measuring circuit including a digital display element is mounted in the slider and is electronically connected to a light emitting element and a light receiving element mounted in the slider. The light emitting element and the light receiving element are disposed opposite to each other with the linear scale and the index scale interposed therein between. In the preferred embodiment, the measuring circuit converts the measured tire diameter into the tire circumference measurement, which is digitally displayed on the LCD. In one particularly preferred embodiment, the circuitry allows the measurements of the front, right rear, left front and left rear tires to be recorded for a later reading of those measurements.

19 Claims, 3 Drawing Sheets

DIGITAL TIRE CALIPER

BACKGROUND OF THE INVENTION

1. Field of the Invention

This invention relates to measuring devices, particularly to devices that measure the diameter of circular objects, particularly those devices that measure the diameter of wheels, tires and similar vehicle support devices. More particularly, this invention relates to apparatus for the digital measurement and calibration of items. Most particularly, this invention relates to the digital measurement of diameter, circumference and the acquiring and storage of ancillary measurements.

2. State of the Art

Tire diameter is an important variable for determining the speed of an automobile. Each time a tire completes one full rotation, the vehicle it is mounted on will have gone forward (or backward) one circumference of the tire. Therefore, knowing the number of times per unit time (second or minute) the tire rotates will be directly proportional to the speed of the vehicle. But if the diameter of the tire is not correct, the speed of the vehicle will register incorrectly as well; the apparent speed will decrease as the actual size of the tire increases. The effect is especially important in automobile racing. There the exact speed is essential, moreover, the faster speed makes a small error in readout read more in absolute terms.

Conventional tire calipers measure the diameter of the tire while the vehicle is at rest. The caliper is placed over the tire and the diameter is read off a measuring device on the caliper. The optical reading of the diameter can lead to incorrect determinations of the diameter. Moreover, the markings on the caliper are difficult to read.

It would be of great benefit to have a caliper that was more easily readable and more accurately readable than the current calipers.

SUMMARY OF THE INVENTION

This invention provides an apparatus and method for measuring tires accurately and quickly using a tire caliper that outputs data in digital form. A measuring instrument determines the diameter of automotive tires, preferably automotive race tires, and displays the circumference or the diameter at the users option. The tool of this invention has a digital display including a relatively elongate caliper body formed with a measuring part adapted to make measuring engagement with the tire to be measured. A member freely slidable in a longitudinal direction of the caliper body and formed with a measuring part disposed opposite to the measuring part of the caliper. In one preferred embodiment, the measuring instrument is marked with a transparent linear scale fixedly disposed on the caliper body with its axis extending in the longitudinal direction of the caliper body and a transparent index scale is mounted on the slider with its calibrated face disposed opposite to the calibrated face of the linear scale in a slightly spaced apart relationship. In this embodiment, a measuring circuit including a digital display element is mounted in the slider and is electronically connected to a light emitting element and a light receiving element mounted in the slider. The light emitting element and the light receiving element are disposed opposite to each other with the linear scale and the index scale interposed therein between. The measuring circuit converts the measured tire diameter into the tire circumference measurement, which is displayed on the LCD. In one particularly preferred embodiment, the circuitry allows the measurements of the front, right rear, left front and left rear tires to be recorded for a later reading of those measurements.

One aspect of this invention is a tire caliper comprising:

an elongate bar;

a first tire sensing rod affixed in perpendicular orientation proximate a first end of the elongate bar;

a slidable housing mounted on the rod and positionable from the location of the first bar to proximate the second end of the elongate bar;

a second tire sensing rod in perpendicular orientation with the elongate bar, and coplanar with and disposed on the same side of the elongate bar as the first tire sensing rod, the second rod affixed to the slidable housing;

a sensor within the slidable housing for providing indicia of the location of the second tire sensing rod on the elongate bar;

a processing means electrically connected to the sensor to sense the position of the sensor; and a digital means to display the position of the sensor electrically connected to the processing means.

A second aspect of this invention is a method for measuring a tire comprising:

placing a tire caliper having a digital read out so that one rod of the caliper touches the tire;

placing the second rod at the maximum distance from the first rod while still remaining in contact with the tire; and reading the numerical display from the digital readout A third aspect of this invention is a tire caliper comprising:

an elongate bar;

a first tire sensing rod affixed in perpendicular orientation proximate a first end of the elongate bar;

a slidable housing mounted on the elongate bar and positionable from the location of the first bar to proximate the second end of the elongate bar, the first bar being rotatable;

a second tire sensing rod in perpendicular orientation with the elongate bar, and coplanar with and disposed on the same side of the elongate bar as the first tire sensing rod, the second rod affixed to the slidable housing, the second rod containing a plurality of sensors to measuring the diameter of the tire across the width of the entire tire;

a sensor within the slidable housing for providing indicia of the location of the second tire sensing rod on the elongate bar;

a processing means electrically connected to the sensor to sense the position of the sensor; and a digital means to display the position of the sensor electrically connected to the processing means.

DETAILED DESCRIPTION OF THE PREFERRED EMBODIMENT

Figure 1:
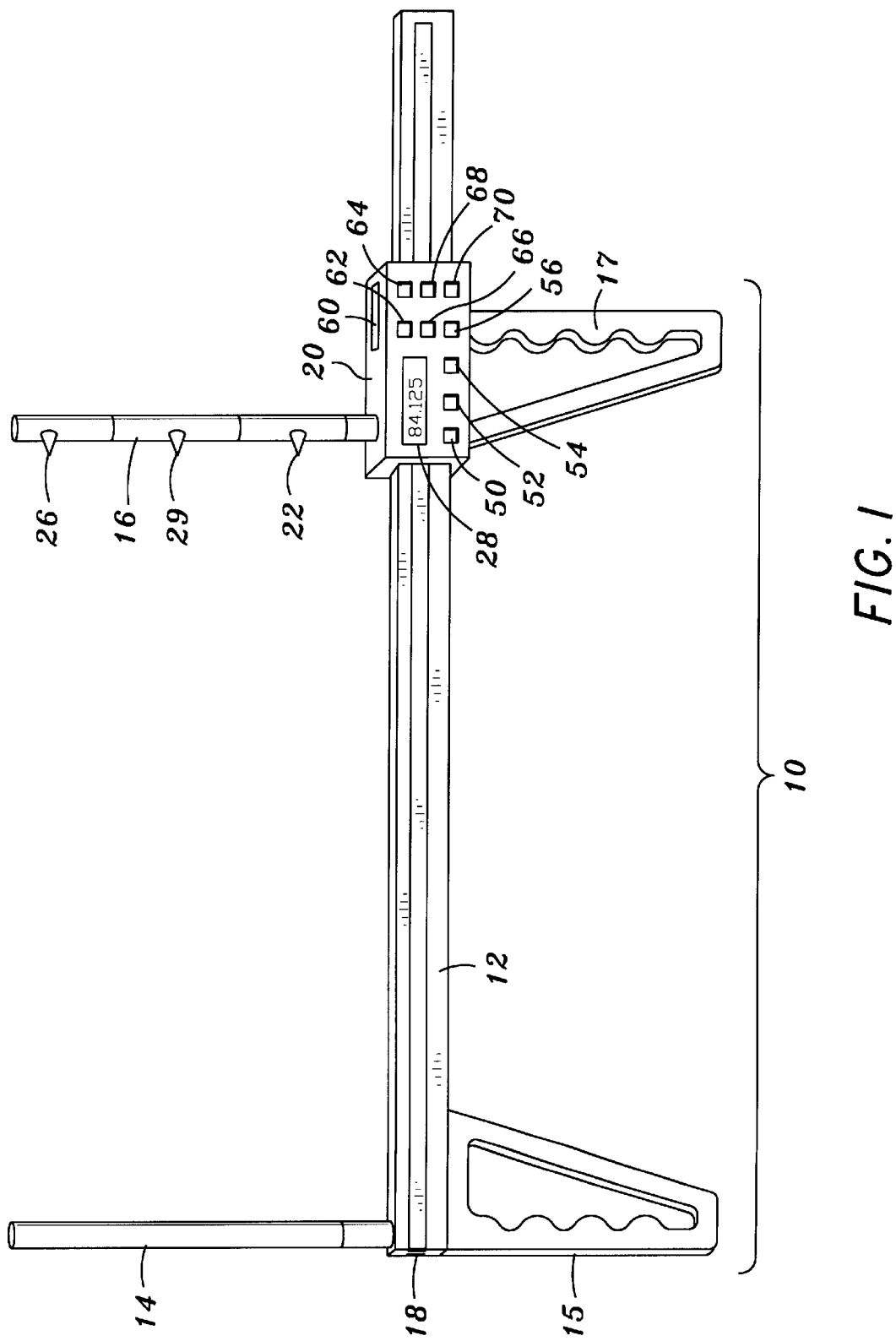
FIGS. 1 and 1A show a perspective view of the digital tire diameter or circumference measuring caliper of this invention showing the caliper in an orientation to measure the diameter or circumference of an automobile tire.
Figure 1A:
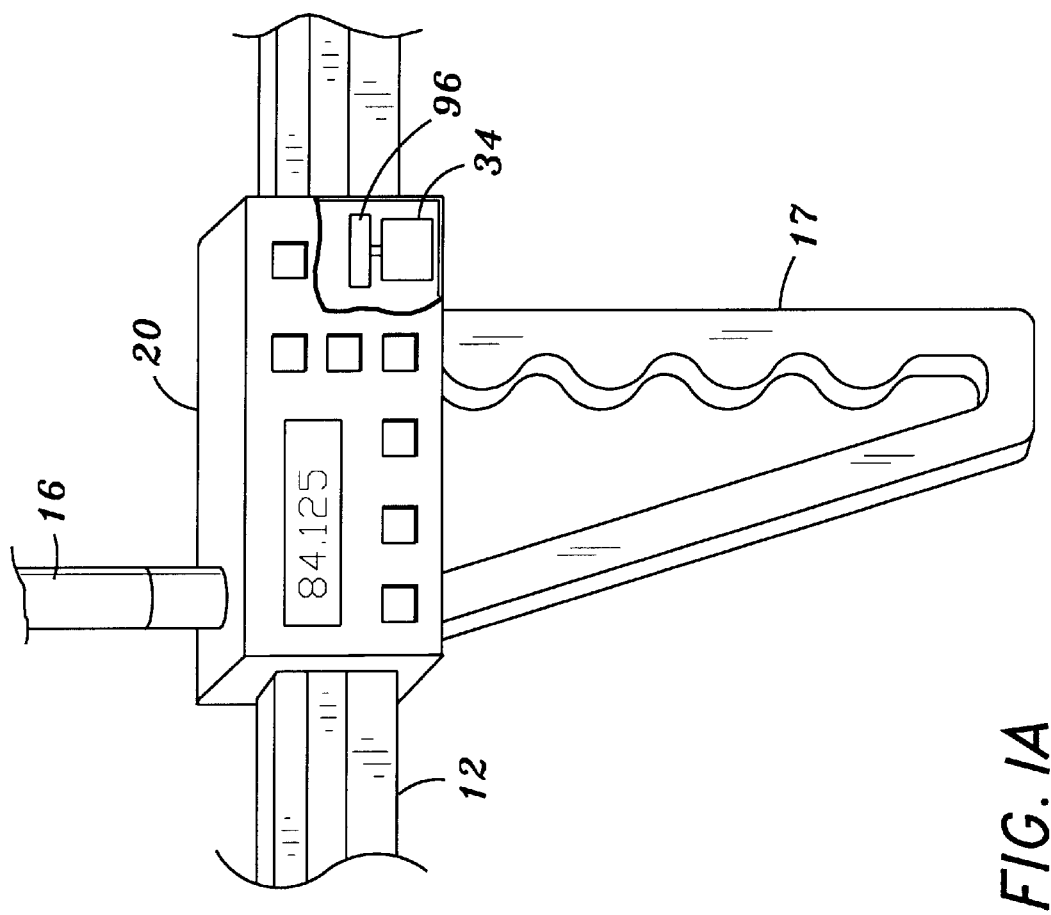

Referring now to FIG. 1, a tire caliper 10 includes an elongate bar 12 and a first tire sensing rod 14, mounted on the end 18 of the elongate bar, and second tire sensing rod 16 affixed on a slidable means 20 mounted on the elongate bar. A tire is measured by slipping the caliper over the tire and placing the first and second rods on opposite sides of the tire just touching the outside of the tire. The read out of the size of the tire is created in the electronic part of the device. A first handle 15 is affixed to the end 18 of the elongate bar, and a second handle 17 is affixed to the slidable means 20 to allow easy manipulation of the device in use. It is preferred that the elongate bar of this invention allow the measurement of tires ranging in size from about 12 inches to about 36 inches, more preferably from about 15 inches to about 30 inches.

At one end of the elongate bar 12 is a first tire sensing rod 14 mounted perpendicularly to the bar 12. It is preferred that the rod 14 rotate so the caliper may be slid over the tire and the maximum distance, which will be the diameter of the tire, is automatically read. Although preferred to be so, the rod 14 need not be a cylinder, and it may be made from the same piece of metal as the bar 12, or the structure may be made of two separate pieces.

Mounted on the elongate bar 12 is the slidable means 20 and the second rod 16, mounted coplanar with and disposed on the same side of the elongate bar 12 as the first tire sensing rod 14 allows the device to be fit to a tire on while it is on a car. The second rod 16 is affixed to the slidable means 20. Within the slidable means 20 is a sensor that provides indicia of the state of the tire, in particular, the diameter, the circumference, the temperature, a comparison of three or more points along the tire width to check for uniformity of wear, and other optional data the user might find useful. Three sensors 22, 24, and 26 are preferred to be mounted on the second rod 16 to allow independent sensing of the diameter of the tire at different locations to determine any unfairness in the wear of the tire.

The display 28 records the diameter of the tire or other user requested indicia. In the embodiment shown, a first button 50 allows the recording and display (depending on the mode chosen) for the right front tire. Similarly, buttons 52, 54, and 56 allow the sensing of the left front tire, the right rear tire, and the left rear tire.

An RS-232 port 60 allows exporting of the data collected to a remote terminal. A depressable button 62 allows the change in mode of the apparatus; a second button 64 is the on/off switch; a third button 66 is the change in mode from Fahrenheit to Celsius; a forth button 68 allows zero reset; and finally the fifth button 70 on the slidable housing 20 allows change in mode from diameter to circumference. These buttons are all arbitrarily set so they can be interchangeably located.

Figure 2:
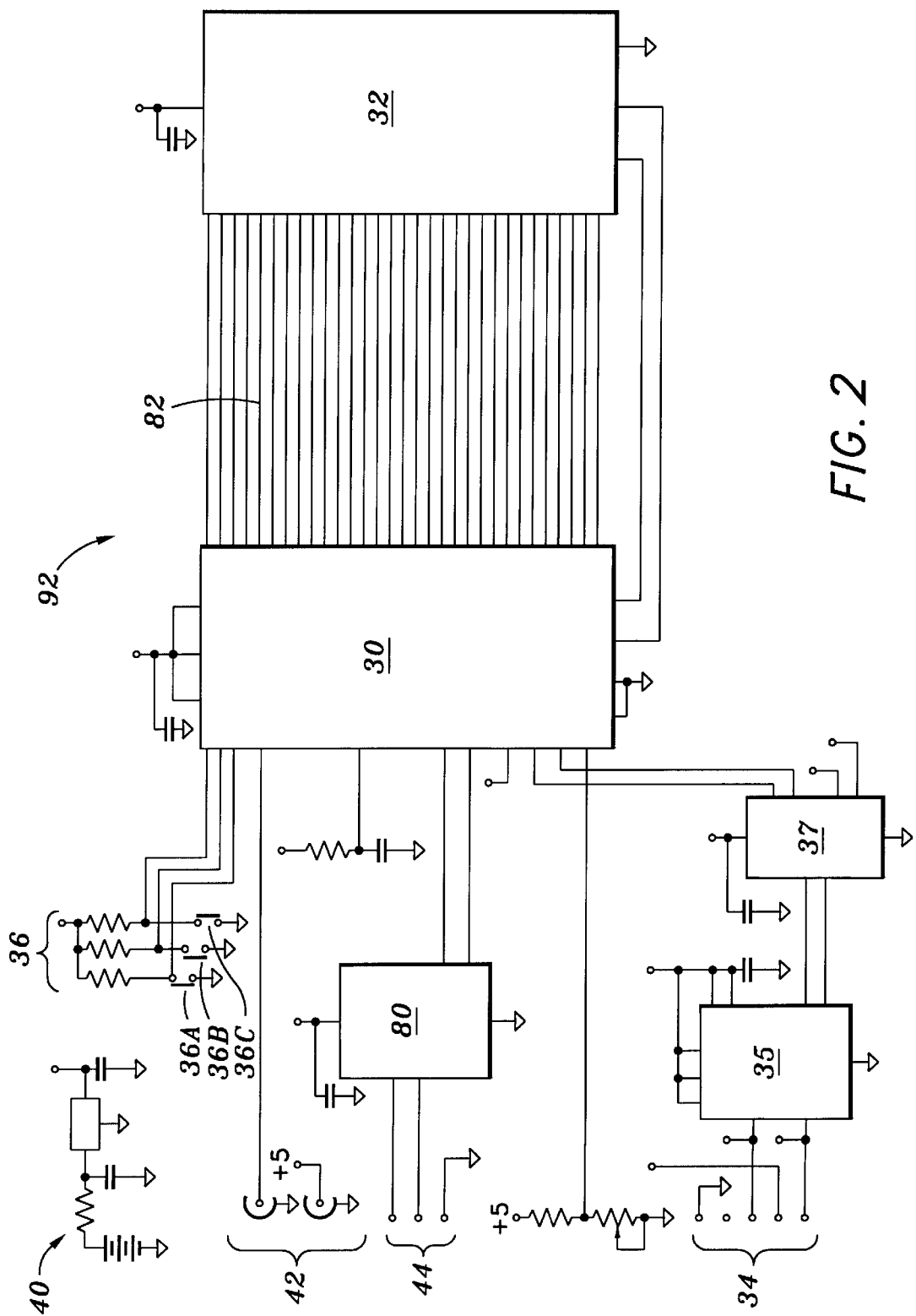
FIG. 2 shows a schematic diagram of the electronic circuits of data entry, measurement display, and the computational aspects of this invention, including the power supply and the analog data entry ports.

Referring now to FIG. 2, the slidable means or the slidable housing 20 contains a processing means 92 electrically connected to the sensors 22, 24, and 26 to sense the position along the elongate bar 12 of the sensor within the slidable housing 20. The processing means 92 senses a physical indication from the sensing means indicating how far along the bar 12 the sensing means is.

A digital means (shown in 28) displays the position of the sensor in the slidable housing and is electrically connected to the processing means 92. The digital means is a digital numeric display device such as a light emitting diode (LED) or the like. The processing means 92 is a battery powered device which has four major components: a low power MICROCHIP 16LC923 microprocessor 30, a 4 digit Numeric LCD and controller 32, the preferred one being the LCD LXD 69, a rotary incremental, quadrature encoder 34, the preferred one being the 74 HC 74 35 together with the 74 HC 08 37; and as many push button switches 36 as needed for mode 36A, max 36B and hold 36C. In the rotary incremental, quadrature encoder 34, an incremental encoder is attached to a quadrature detector that decodes direction and eliminates jitter counts. In this respect, an incremental encoder is a device that converts rotary motion to digital electronic signals. The quadrature detector determines rotary motion direction and eliminates or reduces jitter in an incremental encoder. Mode 36A, max 36B and hold 36C are push-button controls on the device. The mode 36A changes mode. The max 36B starts a recording session and the hold 36C stops the recording session.

The analog data enters the processing unit through the analog port 42. The device can be connected to another computer or data entry port (60 in FIG. 1) and that data can be entered through the data port 44. A Maxim MAX205E allows the interface with the other electronic media.

The preferred voltage is 5 volts for all components and is preferably provided by a battery powered source 40. The controls 36 can be as elaborate or simple as the user prefers. The data lines 82 all provide data to the display 32 for display to the user on the digital means 28. It is preferred that up to four analog inputs be allow the device to record diameter, circumference, temperature, and other data, such as wind velocity and direction, and the like. It is preferred that all data is recorded and stored in the CPU 30 on-board memory. It can then be down loaded later for use at a remote terminal.

The device of the preferred embodiment requires 2 AAA batteries to provide the power in the power source 40 to function correctly. An incremental encoder 35 and 37 attached to a quadrature detector 34 decodes direction and eliminates jitter counts. The information from the sensing rod 16 is fed to the microprocessor which continually updates a display (28 in FIG. 1 and 32 in the schematic). The microprocessor also holds in memory, maximum, zero reference and last reading for recall at the push of a switch. It is preferred that the accuracy of the device is 16 bits over the full range of the calipers, which, for example, equates to 0.0005493" over a 36 inch span. If another span is used, the amount of distance per bit will be different. Preferably, the microprocessor 30 has at least 4 K BYTES of EEPROM memory for date and program storage. The program to calculate distance and display the data will take 145 BYTES of this space, or approximately $\frac{1}{16}$ of the total available storage.

The microprocessor 30 suggested above, and preferred in this invention is an 8 BIT data bus processor. Because of the narrow width of the data bus, it is preferred to use special microprocessor programming techniques to increase the resolution of the data collected to 16 bits. It is therefore preferable to add 2 variable addresses for storing the number representing the physical measurement (one for the upper and one for the lower BYTE). This technique keeps the number of pins required on the CPU chip, and the complexity of the circuitry required to support the CPU down an acceptable level for a device that will be hand held. Of course, other microprocessors can be used, in particular, 16 bit microprocessors and the like can be easily substituted for the suggested 8 bit microprocessor.

In a preferred embodiment, the tire measurements can be stored in the memory of the device for later readout. Each of the tires of the vehicle, usually the front right, the front left, the rear right and the rear left can be measured and stored. Of course the device can be used on vehicles having more than four tires, such as trucks with dual tires and the like, and the values stored for each of the tires for that vehicle.

In one preferred embodiment, the bar 12 of the measuring instrument is marked with a transparent linear scale fixedly disposed on the caliper body with its axis extending in the longitudinal direction of the caliper body and a transparent index scale is mounted on the slidable housing 20 with its calibrated face disposed opposite to the calibrated face of the linear scale and slightly spaced apart relationship. In this embodiment, a measuring circuit including a digital display element is mounted in the slidable housing 20 and is electronically connected to a light emitting element and a light receiving element mounted in the slidable housing 20. The light emitting element and the light receiving element are disposed opposite to each other with the linear scale and the index scale interposed therein between. In the preferred embodiment, the measuring circuit converts the measured tire diameter into the tire circumference measurement, which is digitally displayed on the LCD.

In general, the sensing means in the slidable housing 20 and used in this invention can be any conventional means that produces a variable signal depending on the sensor's distance along the rod 12. Examples include marking made upon the surface of the rod 12, various electrical or magnetic variations such as resistance, impedance, capacitance that might vary with distance, mechanical devices, such as wheels 96 or the like that roll and the number of revolutions can be read by the sensor. The precise means used is not so much an issue as that the means chosen give an accurate and reproducible distance each time the device is used.

The signal from the sensor is an analogue signal and must be digitized for the digital circuitry to work. The analogue/digital converter is connected to a counter, a processor or the like and the output from the processor drives the digital display.

The processing device has a null set so that the device may be set to exactly zero by the user when the user has fully retracted the caliper device. The measurement can be in any convenient units, and the processor used to display the LCD or LED display can be used to convert between a variety of different units, that is, for example, between inches and millimeters, centimeters, feet and meters, and can display the diameter of the tire, or calculate the circumference of the tire. If the device can measure any other units, those units can be displayed as well.

Although LCDs and LEDs are the preferred display mechanism, any other display mechanism can be used. The required portability aspect of this invention dictates the smaller display units, so CRTs and the like will be generally precluded in most applications, although the smaller units can be used.

The material chosen for use as the elongate bar 12 of the measuring device will preferably have a small coefficient of thermal expansion in the temperature regime of about 0° C. and 40° C., which are the typical racing temperatures. The measurement will therefore be essentially the same at any temperature the measurement is taken at.

The first rod 14, mounted on the elongate bar 12, may be essentially just a single piece of metal. However, in the preferred embodiment, it has a roller feature that allows it to roll over the tire. The second rod 16 can have the roller feature, but it is preferred that the second rod have the plurality of sensors mounted in fixed position thereon. The caliper can then be "rolled" down the tire. The largest reading will be the diameter of the tire.

Varieties of other variables can be conveniently measured at the same time as the diameter or circumference of the tire. For example, temperature sensors can allow measurement of the surface temperature of the tire—the processor can correct for the temperature if needed. A second rod arrangement can also measure the width of the tire, if need be.

This invention has been described with reference to specific examples and embodiments thereof. Variations, alterations, and modifications will suggest themselves to those having ordinary skill in the art. Therefore, the appended claims are intended to cover and encompass all such variations, alterations, and modifications.

We claim:

1. A tire caliper comprising:
   an elongate bar;
   a first tire sensing rod affixed in perpendicular orientation proximate a first end of the elongate bar;
   a slidable housing mounted on the elongate bar and positionable from the location of the first bar to proximate the second end of the elongate bar;
   a second tire sensing rod in perpendicular orientation with the elongate bar, and coplanar with and disposed on the same side of the elongate bar as the first tire sensing rod, the second rod affixed to the slidable housing;
   a sensor within the slidable housing for providing indicia of the location of the second tire sensing rod on the elongate bar;
   a processing means electrically connected to the sensor to sense the position of the sensor; and
   a digital means to display the position of the sensor electrically connected to the processing means.

2. The tire caliper of claim 1 wherein the sensor indicates the distance by counting the number of revolutions of a wheel disposed within the slidable housing.

3. The tire caliper of claim 1 wherein the processing means for electronically processing and displaying the measurement of the tire, mounted within the slidable housing calculates the circumference of the tire.

4. The tire caliper of claim 1 wherein the processing means displays the diameter of the tire.

5. The tire caliper of claim 1 wherein the processing means displays an indicia selected from the group consisting of diameter and circumference in units that are user selectable.

6. The tire caliper of claim 5 wherein the units are selected from the group consisting of inches, millimeters, centimeters, feet, and meters.

7. A method for measuring a tire comprising:
   placing a tire caliper having a digital read out so that a first rod of the caliper touches the tire;
   placing a second rod at the maximum distance from the first rod while still remaining in contact with the tire, wherein a sensor within the tire caliper provides indicia of the location of the second rod; and
   reading the numerical display from the digital readout to determine the position of the sensor, wherein the digital read out is electrically connected to a processing means and wherein the processing means is electrically connected to the sensor to sense the position of the sensor.

8. The method of claim 7 the method further comprising reading the circumference from the digital readout.

9. The method of claim 7 wherein the placing step further comprises rolling the rotatable rod of the caliper on the tire and reading the largest number.

10. A tire caliper comprising:
    an elongate bar;
    a first tire sensing rod affixed in perpendicular orientation proximate a first end of the elongate bar;

a slidable housing mounted on the elongate bar and positionable from the location of the first bar to proximate the second end of the elongate bar, the first bar being rotatable;

a second tire sensing rod in perpendicular orientation with the elongate bar, and coplanar with and disposed on the same side of the elongate bar as the first tire sensing rod, the second rod affixed to the slidable housing, the second rod containing a plurality of sensors to measuring the diameter of the tire across the width of the entire tire;

a sensor within the slidable housing for providing indicia of the location of the second tire sensing rod on the elongate bar;

a processing means electrically connected to the sensor to sense the position of the sensor; and a digital means to display the position of the sensor electrically connected to the processing means.

11. The tire caliper of claim 10 wherein the sensor indicates the distance by counting the number of revolutions of a wheel disposed within the slidable housing.

12. The tire caliper of claim 10 wherein the processing means for electronically processing and displaying the measurement of the tire, mounted within the slidable housing calculates the circumference of the tire.

13. The tire caliper of claim 10 wherein the processing means displays the diameter of the tire.

14. The tire caliper of claim 10 wherein the processing means displays an indicia selected from the group consisting of diameter and circumference in units that are user selectable.

15. The tire caliper of claim 14 wherein the units are selected from the group consisting of inches, millimeters, centimeters, feet, and meters.

16. A tire caliper for measuring a tire and its temperature, comprising:

an elongate bar;

a first tire sensing rod affixed proximate a first end of the elongate bar;

a slidable housing mounted on the elongate bar and positionable from the location of the first bar to proximate a second end of the elongate bar;

a second tire sensing rod coplanar with and disposed on the same side of the elongate bar as the first tire sensing rod, the second rod affixed to the slidable housing;

a plurality of sensors mounted on the second tire sensing rod, wherein when the tire is placed between the first and second tire sensing rods, the sensors provide a first electrical signal corresponding to the temperature of the tire;

a sensor mounted in the slidable housing:

a processing means connected to the sensors on the second tire sensing rod to receive the first electrical signal, as well as to the sensor in the slidable housing, wherein the processing means converts the first electrical signal to a temperature of the tire and converts a second electrical signal from the sensor in the slidable housing to a measurement of the tire and wherein the measurement of the tire is the diameter or the circumference of the tire; and a digital display electrically connected to the processing means, wherein the digital display displays the temperature of the tire and measurement of the tire and wherein the digital display is an LCD display, an LED display or a CRT display.

17. The tire caliper of claim 16, wherein the first electrical signal from the sensors is an analog signal.

18. The tire caliper of claim 17, wherein the analog signal is digitized in the processing means.

19. A method for measuring a tire temperature, comprising:

placing a tire caliper having a digital read out so that a first rod of the caliper touches the tire;

placing a second rod at the maximum distance from the first rod while still remaining in contact with the tire wherein a plurality of sensors is mounted on the second rod;

providing an electrical signal from the sensors on the second rod, the electrical signal corresponds to a temperature of the tire;

receiving the electrical signal by a processing means connected to the sensors on the second rod, wherein the processing means converts the electrical signal to a temperature of the tire; and displaying the temperature of the tire on a digital display that is electrically connected to the processing means, wherein the digital display is an LCD display, an LED display or a CRT display.

* * * * *